United States Patent [19]

Coiffman

[11] Patent Number: 5,114,289

[45] Date of Patent: May 19, 1992

[54] DISPLACED FILLER NUT

[76] Inventor: Bernardo Coiffman, 3610 Yacht Club Dr., Apt. 601, North Miami Beach, Fla. 33180

[21] Appl. No.: 688,309

[22] Filed: Apr. 22, 1991

[51] Int. Cl.⁵ ............................................. F16B 31/02
[52] U.S. Cl. ......................................... 411/13; 411/8; 411/14
[58] Field of Search .................... 411/13, 8, 2, 1, 3, 411/4, 14

[56] References Cited

U.S. PATENT DOCUMENTS 4,138,922  2/1979  Richter et al. ................... 411/14
4,411,549 10/1983  Sheppard ....................... 411/8 X

FOREIGN PATENT DOCUMENTS 188708 11/1922 United Kingdom ............... 411/378

Primary Examiner—Rodney M. Lindsey

[57] ABSTRACT

As used with a nut, a device for indicating tensile strength comprises an annular groove approximately ⅛ inch in depth on the bottom of the nut adjacent to a washer. The same groove may be fitted in a bolt if the device is used with a bolt. A vertical shaft of the same diameter as the groove is also located within the nut or bolt engaging member and connects at one end to the groove. The groove and vertical shaft contain a "filler" material. A washer having a boss or protrusion is utilized with the engaging member wherein the boss or protrusion fits into the said groove. Once the washer encounters friction, when the combination nut and washer is tightened about a threaded bolt, with the connecting elements, the protrusion inside the groove pushes the filler up the vertical shaft as the nut rotates over the washer.

13 Claims, 3 Drawing Sheets

DISPLACED FILLER NUT

FIELD OF INVENTION

This invention relates to a nut or bolt that is capable of inidicating tensile strength. It is also capable of determining if the nut of bolt has become loose. More specifically, the nut, or bolt, contains a filler that is displaced when it is installed to determine minimum tensile stength.

BACKGROUND OF THE INVENTION

High-stength bolting of steel structures have surpassed the use of rivots because of distinct economic advantages. Though the purchase price of high-strength bolt is nearly three times that of a rivot, the overall cost of the bolted construction is cheaper than the rivoted construction because of the reduced labor and equipment costs and the reduced number of bolts required to resist the same loads. Other advantages include the use of lesser skilled labor and the ability to erect rapidly structures in the field.

The installation of the high-strength bolts consists of tightening the bolt to a minimum tension. The reason that minimum tension is desired is to prevent the occurrence of bolt deflection when actual loads are applied. Bolt deflection will cause eccentric load to bear which subjects the bolt to possible shearing and bending moments for which it may not be designed.

Presently, the methods most commonly applied to obtain minimum tensile stength include: (1) applying a determined torque to each size bolt and having the wrench stall automatically (or "breaking the bolt") at a predetermined torque, (2) by back-turning the bolt a determined amount from a snug-tight position known as "turn of the nut" method, and by (3) tightening a washer having bumps and then flattening them by rotating a nut or bolt unto the washer, thus, indicating the tension applied.

None of the above stated methods is satisfactory in obtaining desired tensile strength. There serveral reasons why these methods are unsatisfactory. First, visual inspection is required at the time of installation to check that the carefully calibrated tools required are used correctly. Second, workers are oftentimes known to flatten the bumps on tension washers with hammers prior to installation to make the bolt easier to tighten thereby defeating the tension washer's ultimate purpose. A third reason is that rusty twist off bolts may break off before they reach the right tension. Fourth, none of these methods indicates if the bolt has been loosened due to temperature variation or vibration.

Furthermore, these methods of installation do not indicate overtightening. The concerns of overtightening the bolts to the extent that they reach a plastic range are grave. Some argue that overtightening is not a problem because if a bolt is overtightened, it would break and be replaced. However, replacement is very costly with respect to anchor bolts that would have the broken piece embedded in the connecting element.

SUMMARY OF THE INVENTION

The present invention has been designed to overcome the above stated problems. It provides visual inspection of a properly installed nut or bolt so as to assure that proper tensile strength has been reached. Furthermore, the present invention provides an easy mechanism by which one can determine whether or not the nut has been loosened by for example, temperature variation or vibration.

As used with a nut, the present invention comprises an annular groove which varies in depth, size, depending on the type of filler used, on the bottom of the nut adjacent to a washer. The same groove may be routed in a bolt if the present invention is used with a bolt. A shaft, vertical or horizontal, of the same diameter as the groove is also located within the nut or bolt engaging member and connects at one end to the groove. The groove and shaft contain a filler material. A washer having a boss or protrusion is utilized with the engaging member wherein the boss or protrusion fits into the said groove. Once the washer encounters friction with a connecting element, when the combination nut and washer is tightened about a threaded bolt, the protrusion inside the groove pushes the filler through the shaft as the nut rotates over the washer. As an alternative to the vertical shaft, a side shaft may be employed. To assure a proper starting position, the washer and nut or bolt are disengagably connected. The filler could be manufactured from an inexpensive material and could be color-coded to indicate desired tensile strength depending on amount of displaced filler. Furthermore, in order to insure proper frictional engagement between the washer and connecting element, the washer's bottom end adjacent to the connecting element is provided with a roughed surface, compared to the smoother top surface, to insure that the path of least friction is that path between the nut or bolt and washer and not the connecting element and washer.

BRIEF DESCRIPTION OF THE DRAWINGS

The features embodying the present invention are illustrated in the accompanying drawing, forming a part of this application, in which.

DETAILED DESCRIPTION OF A PREFERRED EMBODIMENT

Figure 1A:
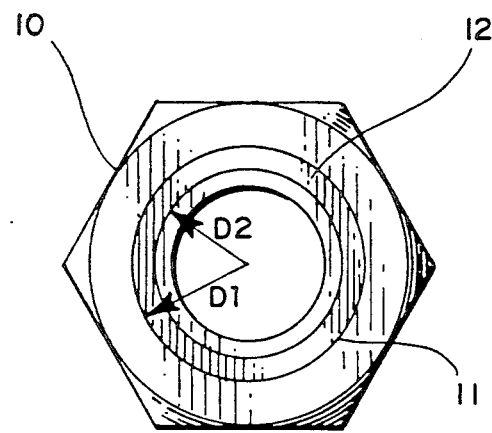
FIG. 1A is a bottom plan view of the present invention employing in a high-strength nut.

Referring to FIG. 1A, a high-strength nut 10 has fitted about its bottom an annular groove 11. Filler 12 is contained within groove 11 and may be made of any conventional filler medium such as clay, moldable plastic, electrical conductive wire, or other filler medium.

Figure 1B:
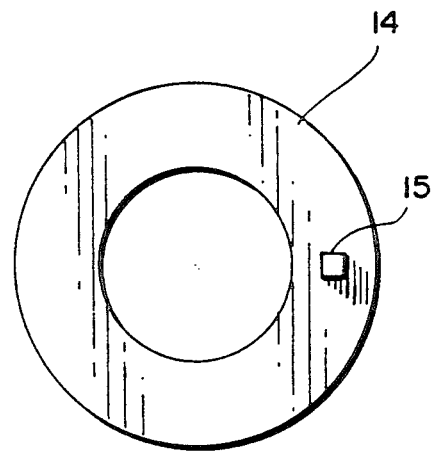
FIG. 1B is a top plan view of a washer with protruding boss member.

FIG. 1B depicts a conventional washer 14 having a boss 15.

Figure 2A:
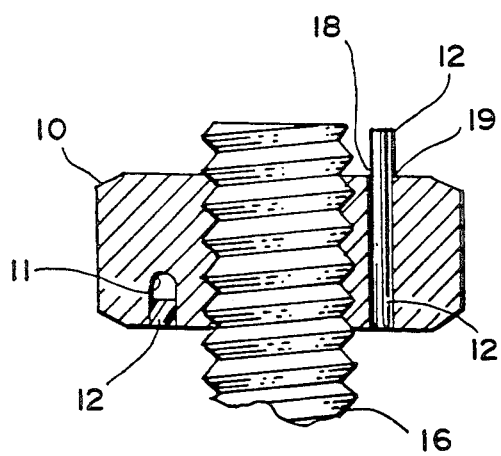
FIG. 2A is a side elevation cross section view of the present invention.
Figure 2B:
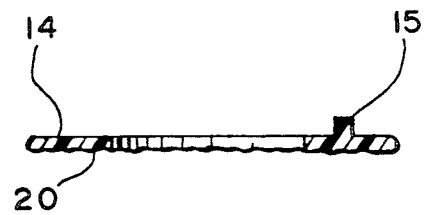
FIG. 2B is a cross section view of a washer having a boss member.

FIG. 2A depicts the nut 10 about threads of a bolt 16. As is clearly shown in the depiction FIG. 2A, nut 10 has a shaft 18 which is vertical and which allows filler 12 a point of egress at position 19 of nut 10. A preferred embodiment of groove 11 provides for the groove to be ⅛ inch in height from the bottom of nut 10. FIG. 2B depicts how boss 15 rises above washer 14. Boss 15 of a size sufficient to displace filler 12 located in nut 10 when said nut is rotated about bolt 16. Therefore, boss 15 is of a height less than ⅛ of an inch and of a width less than the width of the groove 11. Furthermore, as may be seen in FIG. 2B, washer 14 has an underside 20 that has a non-smooth surface which enhances frictional engagement with a connecting element.

Figure 3A:
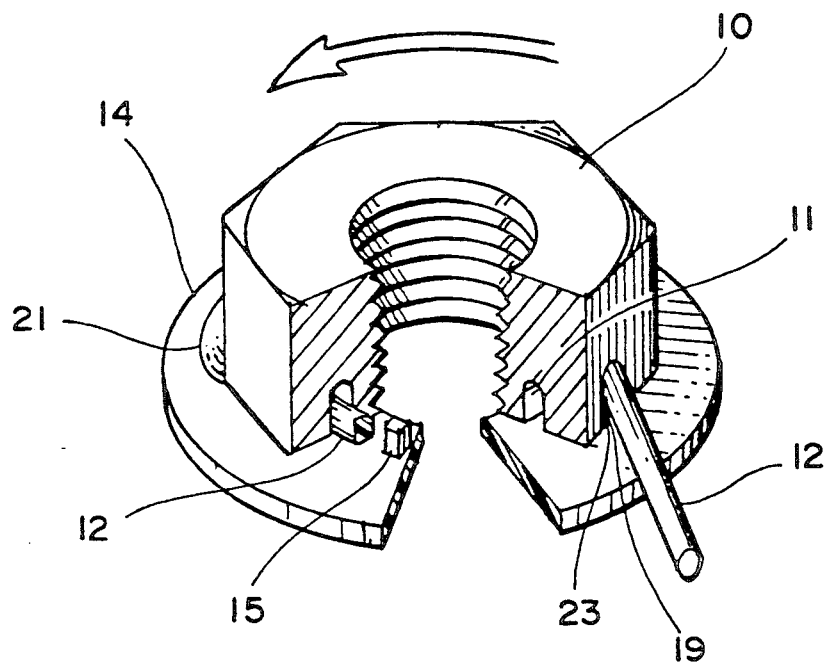
FIG. 3A is a fragmented perspective view of the present invention employing a high-strength nut and depicts an alternative embodiment.
Figure 3B:
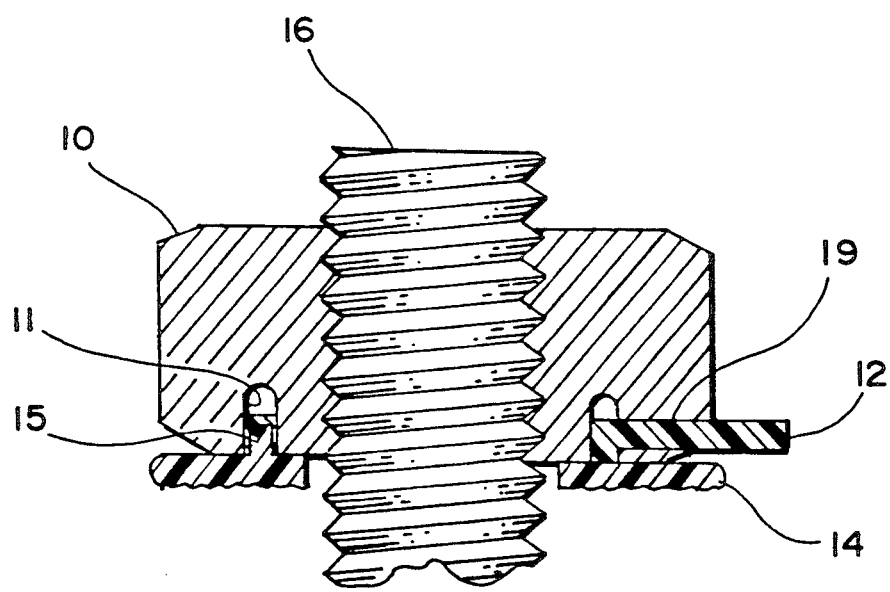
FIG. 3B is a side elevation cross section view of an alternative embodiment of the present invention employing a high-strength nut.
Figure 4A:
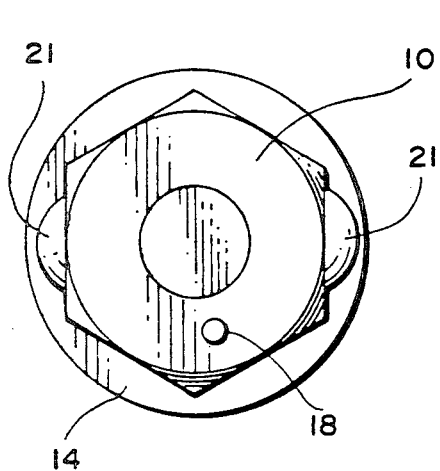
FIG. 4A is a bottom plan view of the present invention employing a nut in assembly with a washer.
Figure 4B:
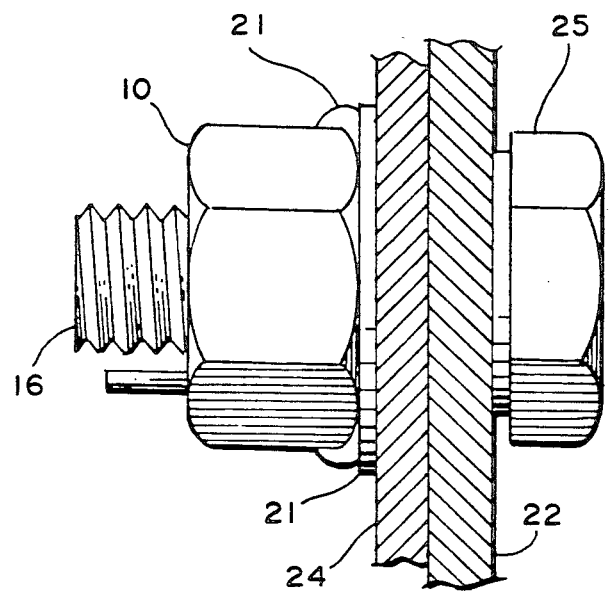
FIG. 4B is a side elevation view of the present invention as assembled.

In use, the present invention, as an alternative embodiment, may be seen in FIG. 3A and FIG. 3B. In FIG. 3A, phantom arrows depict the rotation of nut 10 in combination with washer 14. Nut 10 and washer 14 are disengagably connected at a point or points between them with glue 21. The combination of nut 10 and washer 14 are initially threaded about a threaded bolt 16 as depicted in FIG. 3B. Depending upon the tensile strength desired, nut 10 is further rotated to initiate displacement of an amount of filler 12 at egress point 19 of horizontal shaft 23 located on the side of nut 10. The amount of filler 12 displace thus acts as an indicator of the tensile strength desired. In the alternative, the filler 12 may be color coded such that different colors of said filler 12 represent different degrees of tensile strength. FIG. 4B shows how the present invention as a preferred embodiment reacts under any desired tensile strength when used to engage connecting elements 22 and 24 with different color-coded displaced filler.

Figure 5A:
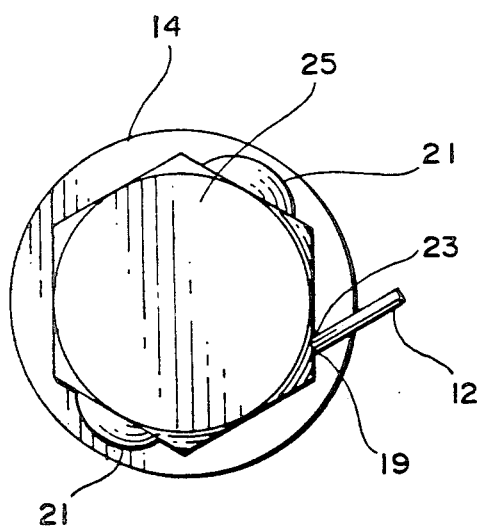
FIG. 5A is a top plan view of an alternative embodiment of the present invention employing a bolt.
Figure 5B:
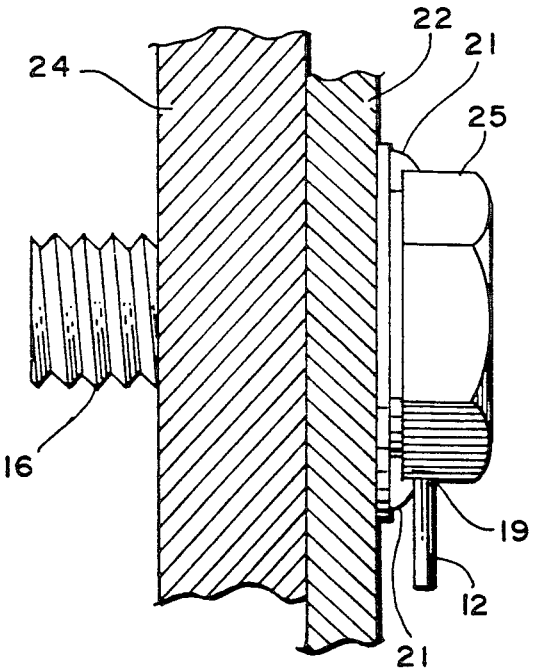
FIG. 5B is a fragmented side elevation view of an alternative embodiment of the present invention employing a bolt.

FIGS. 5A and 5B show the present invention employing an alternative embodiment. Instead of nut 10 containing a groove, said groove 11 is located about the base of a head 25 of bolt 16. FIG. 5A depicts filler 12 egressing from the horizontal shaft 23 of bolt head 25 at the egress point 19. Similar to the depiction of FIG. 3B, FIG. 5B shows the displaced filler 12 extending out of the bolt head 25 thus indicating an amount of desired tensile strength between said bolt 16 and the connecting elements 22 and 24.

It is intended that the description of the preferred embodiment and alternative embodiments of this invention is illustrative only. Other embodiments of the invention that are within the scope and concept as described herein are therefore included within the confines of this application.

What is claimed is:

1. A device for indicating tensile strength, said device comprising, in combination;
    a nut having an annular groove routed on the bottom thereof and connected to a shaft having an egress point which terminates at the top or side of the said nut,
    a filler material, wherein said filler material is placed within said annular groove and shaft, and;
    a washer having a boss, said boss being of a size smaller in height and width than said annular groove sufficient to fit within said annular groove, wherein said nut and said washer are disengagably connected.

2. In the device of claim 1, said washer having a bottom end nd a top end, said bottom end having a roughed surface to enhance frictional engagement with a connecting element.

3. In the device of claim 1, said filler material having comprising a color-coding such that when installed, said boss acts to push said filler material thus displacing its color-coding at the egress point of said nut when said nut is rotated onto a connecting element.

4. In the device of claim 1, said disengagable connection is glue

5. In the device of claim 1, said filler is comprised of clay, moldable plastic or electrical conductive wire.

6. In the device of claim 1, said shaft may be vertical or horizontal.

7. A device for indicating tensile strength, said device comprising, in combination;
    a bolt having a top, a bottom, an annular groove and a vertical shaft, wherein said annular groove is routed on the bottom of said bolt and connected to said vertical shaft within said bolt, said vertical shaft having an egress point which terminates at the top of the said bolt,
    a filler material, wherein said filler material is placed within said annular groove and vertical shaft, and;
    a washer having a boss, said boss being of a size smaller in height and width than said annular groove sufficient to fit within said annular groove, wherein said bolt and said washer are disengagably connected.

8. In the device of claim 7, said washer having a bottom end and a top end, said bottom end having a roughed surface to enhance frictional engagement with a connecting element.

9. In the device of claim 7, said filler material having a color-coding such that when installed, said boss acts to push said filler material thus displacing its color-coding at the egress point of said bolt when said bolt is rotated onto a connecting element.

10. In the device of claim 7, said disengagable connection is glue.

11. In the device of claim 7, said filler is comprised of clay, moldable plastic or electrical conductive wire.

12. In the device of claim 1, said shaft may be vertical or horizontal.

13. A device for indicating tensile strength, said device comprising;
    a group consisting of a nut and a bolt member, said group member having a top, a side, a bottom, a shaft and an annular groove which is routed on the bottom of said member and connected to said shaft having an open egress point which terminates at the said top or said side of the said nut or bolt and having
    a filler material wherein said filler material is placed within said annular groove and said shaft which can be displaced through said open egress point to indicate tensile strength.

* * * * *